J. E. FISHER, Jr.
AUTOMATIC BRAKING DEVICE FOR AUTOMOBILES.
APPLICATION FILED MAR. 31, 1911.
1,054,640.
Patented Feb. 25, 1913.
2 SHEETS—SHEET 1.
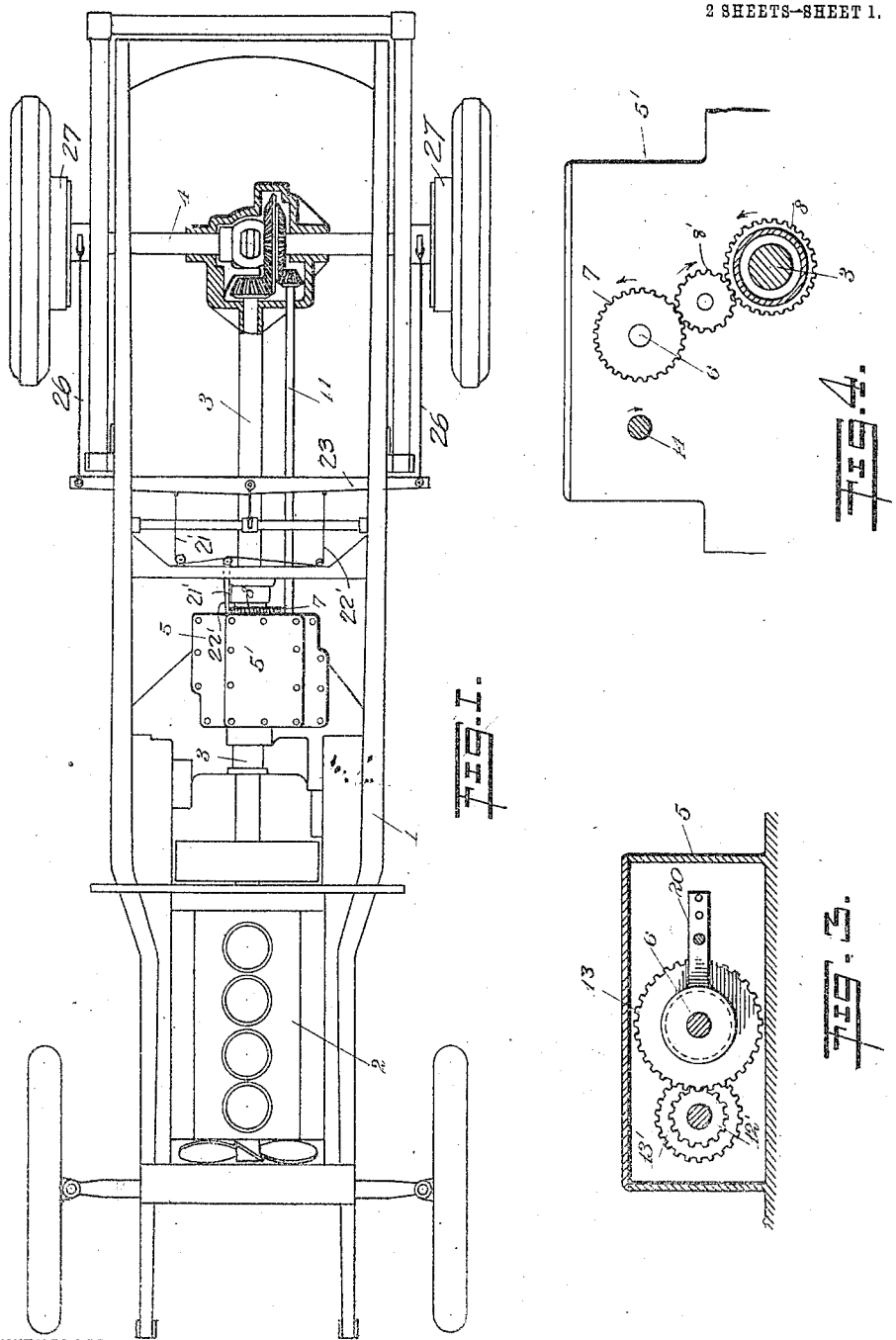
WITNESSES:
G. Robert Thomas
Wm. F. Nickel
INVENTOR
Joel E. Fisher Jr.
BY Munn & Co
ATTORNEYS

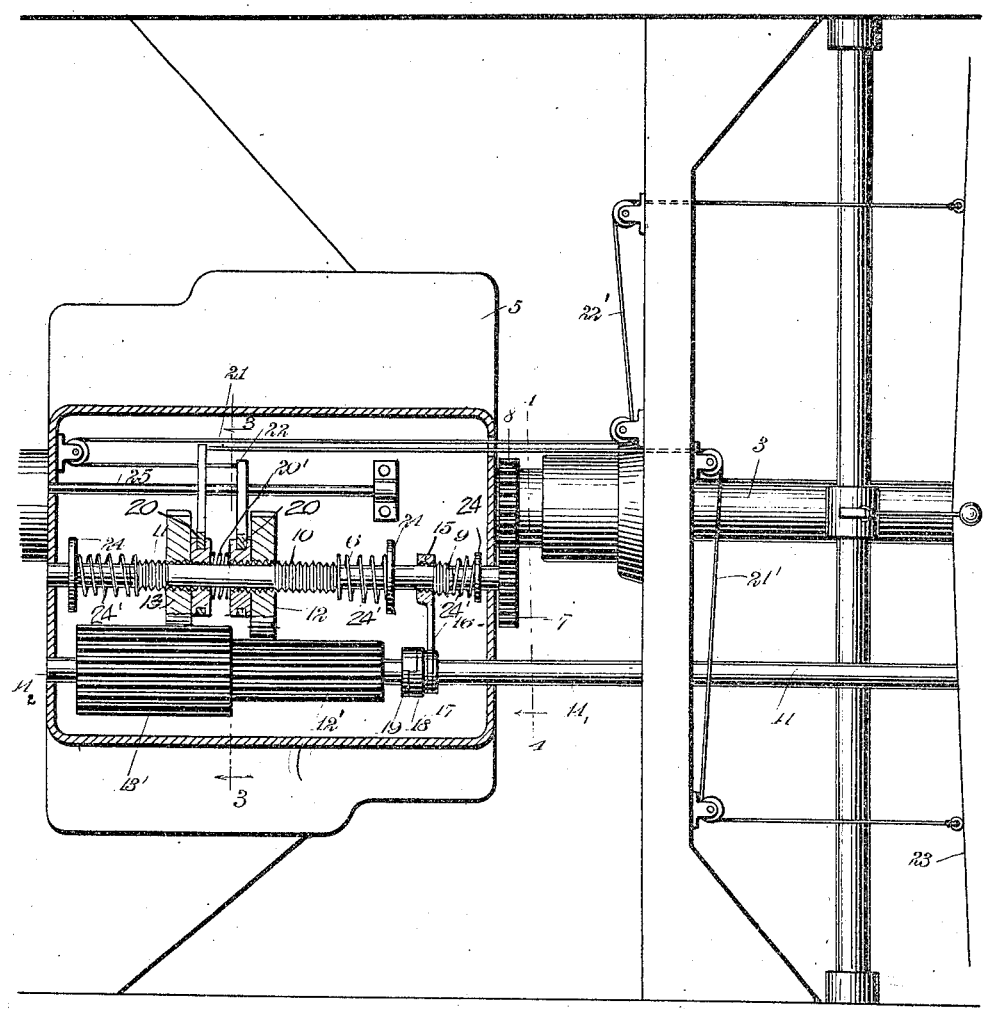

UNITED STATES PATENT OFFICE.

JOEL ELLIS FISHER, JR., OF NEW HAVEN, CONNECTICUT.

AUTOMATIC BRAKING DEVICE FOR AUTOMOBILES.

1,054,640.  Specification of Letters Patent.  Patented Feb. 25, 1913.

Application filed March 31, 1911. Serial No. 618,057.

*To all whom it may concern:*

Be it known that I, JOEL E. FISHER, Jr., a citizen of the United States, and a resident of New Haven, in the county of New Haven and State of Connecticut, have invented a new and Improved Automatic Braking Device for Automobiles, of which the following is a full, clear, and exact description.

My invention relates to braking mechanism for automobiles and motor vehicles in general, and it is designed to be automatically thrown into action to prevent racing of the driving wheels of the machine, when, owing to the nature of the road, or from any other cause, frictional engagement of one of the driving wheels with the ground is lessened.

To this end it comprises a novel arrangement of parts which will be fully described in the accompanying specification and pointed out in the claims appended thereto.

Reference is to be had to the accompanying drawings forming a part of this specification, in which the same characters of reference indicate the same parts in all the views.

Figure 1 is a top view of an automobile having my improved braking device in position thereon; Fig. 2 is an enlarged view of the braking mechanism, showing the arrangement of the gears controlling the same on the top of the main gear casing; Fig. 3 is a section on the line 3—3 of Fig. 2, looking in the direction of the arrow; and Fig. 4 is a section on the line 4—4 of Fig. 2, looking in the direction of the arrow.

On the drawings, the numeral 1 indicates the frame-work or chassis of an automobile, or any other motor vehicle, and 2 indicates a motor, such as a gas engine, which furnishes the power to drive the machine.

3 is the crank shaft of the engine, which transmits motion to the rear axles 4 through a suitable form of differential gearing adjacent the rear end of the shaft 3. The shaft 3 passes through a casing 5, which contains a speed controlling mechanism of ordinary type.

On the top of the gear casing 5 is a smaller casing 5', on which is mounted in bearings, a shaft 6, parallel to the shaft 3. This shaft has a gear 7 on its outer end, which meshes through a gear 8' with an equal gear 8 on the shaft 3, and receives motion therefrom.
The shaft 6 is screw-threaded for a short distance in three separate places, indicated by the numerals 9, 10 and 11. To the left of the screw-threaded portion 9 is arranged a threaded collar 15; and a gear wheel 12 is arranged to the left of the screw-threaded portion 10. This gear wheel 12 is internally threaded, but is loosely mounted on the shaft 6, except when it engages with the screw-threads 10.

13 is a similar gear wheel somewhat smaller than the gear 12, arranged to the right of the screw-threaded portion 11, and internally screw-threaded like the gear 12. Further, like the gear 12, the gear 13 is loose with respect to the shaft 6, except when it engages the screw-threads 11.

It will be noted by referring to Fig. 2, that the threads on the threaded portions 9, 10 and 11, are of greater diameter than the thickness of the shaft 6. In fact, I prefer to make the diameter of the shaft 6, except at the three threaded portions mentioned, to be no greater than the internal diameter of the threads on the three threaded portions, so that the gears 12 and 13 and the collar 15 can move freely around the shaft, except when they are engaged by the threaded portions.

Parallel with the shaft 6 and mounted in bearings in the opposite ends of the casing 5', is a third shaft 14, this shaft extending back to be gear connected with one of the rear axles 4. As shown on the drawings, the left-hand axle is used for this purpose, and the shaft 14 is so geared thereto that it will rotate in a direction opposite to the shaft 3, and in the opposite direction with regard to the shaft 6. The shaft 14 comprises two sections 14₁ and 14₂, which are united by clutch members 18 and 19, secured to the adjacent ends of these sections. The clutch 19 is fixed upon the shaft section 14₂; while the clutch member 18 is mounted to rotate with, but slide longitudinally upon, the section 14₁. The member 18 has a hub 17 which has a circumferential groove therein to receive the forked end of an arm 16 integral with the collar 15 on the shaft 6. The other section 14₂ carries a pair of gear wheels 12' and 13', which mesh with the gears 12 and 13 respectively, and are mounted to rotate with the shaft 14.

The two gears 12 and 13 have hubs 20 secured thereto and extending from their adjacent faces toward each other, and these hubs have circumferential grooves to receive the forked ends of levers 21 and 22, the lever 21 being for the gear 13, and the lever 22 for the gear 12. These levers have apertures in their outer ends, through which is passed a fixed rod or spindle 25, with reference to which these levers have sliding movement. To the ends of the levers 21 and 22 are attached cords 21' and 22' respectively, which pass over grooved guide-wheels, and are united at their opposite ends to a brake-beam 23, in such a way that when the lever 22 on the gear 12 moves to the right, the brake-beam 23 will be swung in a clockwise direction to apply the brake to the left wheel, and when the lever 21 is moved to the left, it will swing the brake-beam 23 in such a way as to apply the brake to the right drive wheel of the machine. The ends of the brake beam are connected by rods 26 to brakes indicated diagrammatically at 27.

It will be understood that the levers 21 and 22 and 16 permit free rotation of the hubs 20 and 17. At the same time, when lateral movement is given the lever 16, the hub 17 and the clutch member 18 will be moved longitudinally on the shaft 14, and when longitudinal movement is given to either of the gears 12 or 13, and the hub 20 which is carried thereby, the levers 21 and 22 will be moved laterally along the bar 25.

A spiral spring 20' surrounds the shaft 6 between the hubs 20, and acts normally to force these hubs apart. This spring may be normally attached to one or both of the hubs and keeps these hubs in such relative position to the threaded portions 10 and 11, that they will be engaged by these threaded portions under the proper conditions.

The numeral 24 indicates three collars on the shaft 6, located in the position shown; and 24' are spiral springs attached to these collars at one end, the function of these springs being to engage the opposite sides of the gears 12 and 13, and the right-hand side of the collar 15, to keep the gears and the collar from moving too far away from the threaded portions 9, 10 and 11, so that they will be in position to be moved back after they have been engaged by the threaded portions 9, 10 and 11, and caused to move a certain distance along the shaft 6.

15' is a spring similar to the spring 20', and is attached to one of the collars 24, and engages the collar 15, to keep the collar 15 in position to be engaged by the threaded portion 9, under conditions required.

The manner of operation is as follows: Suppose the right wheel of the apparatus should rest upon the ground, and the left wheel should run into mud or soft snow, then, owing to the action of the differential gearing connecting the driving shaft 3 to the driving axles 4, the wheel on the left side will begin to race, and his will cause the shaft 14 to have very rapid rotation. The ratio of the gears 13 and 13' is about 1 to 1, while the ratio of the gears 12 and 12' is about 2 to 1. If, now, the shaft 6 be turning contrary to the direction of the motion of the hand of a clock, the shaft 14 will of course be turning clockwise, and when the shaft 14 begins to rotate so much faster than the shaft 6, the gear 12 will rotate faster than the shaft 6 likewise, and will engage the threaded portion 10 and move to the right, reference being had to Fig. 2. This will actuate the lever 22 and the cord 22', to swing the brake beam in a clockwise direction and apply the brake to the wheel on the left-hand side. The gears 13 and the collar 15 are not actuated in this case. Suppose, now, the left wheel should be on firm ground and the right one should begin to race; the shaft 14 will now rotate much slower than the shaft 6. The result will be that the gear 13, owing to engagement with the gear 13' on the shaft 14, will move much slower than the shaft 6, and it will be engaged by the threads on the threaded portion 11, and move to the left. This will pull upon the cord 21', moving the brake-beam 23 in a counter-clockwise direction to apply the brake to the right wheel. The right wheel will thus be checked. Should the propeller shaft 3 reverse at any time, the shaft 6 will likewise be reversed, causing the threads 9 to engage the collar 15. This will pull the collar 15 to the left, throwing the clutch members 18 and 19 apart. The springs 24' carried by the collars 24 on the shaft 6 will prevent the gears 12 and 13, and the collar 15, from traveling too far away from the threaded portions of the shaft 6, shown at 9, 10 and 11, and keep the gears 12 and 13 and the collar 15 in position to be moved back to their starting points as soon as the shafts 6 and 14 resume their normal speed relations with each other.

By means of my improved braking mechanism, the resistance to both movements of the driving wheels is made equal, and should one of the wheels start to race, artificial resistance is applied in the form of a brake effect to the one that has the less traction, and the power of the engine no longer goes all to one wheel turning uselessly in the mud, but half of the power at least will go to the wheel on the firm ground, so as to force the car forward. With such a device there is absolutely no danger that an automobile will get immovably stalled in case one of the wheels should, from any cause, fail to get into proper engagement with the ground.

It will be observed, as above, that the braking apparatus is disconnected by the collar 15 throwing apart the clutch members 18 and 19. The reason for this is that if the clutch members 18 and 19 were not thrown apart, the brake would be applied on the wrong side if the car should start to go backward.

Having thus described my invention, I claim as new and desire to secure by Letters Patent:

1. In a motor vehicle, the combination of driving wheels and brake actuating mechanism therefor, and means controlled by the movement of one of said driving wheels, to throw the said mechanism into action when one of said driving wheels begins to race, to check the same and thus prevent the power of the motor from being diverted from the other wheel.

2. In a motor vehicle, the combination of driving wheels and a main shaft to drive the same, a shaft geared to the main shaft, said shaft having threaded portions arranged at different places along its length, a pair of gears loosely mounted upon said shaft, each of said gears being located adjacent one end of one of said threaded portions, another shaft geared to receive motion from one of the driving wheels and having gears thereon to mesh with the gears on the first-named shaft, and brake applying mechanism actuated by the gears on the first-named shaft, one or the other of said gears on the first-named shaft being engaged by the threaded portions on said shaft to throw the brake applying mechanism into action when one of the driving wheels begins to race, to check the same.

3. In a motor vehicle, the combination of driving wheels and a main shaft for transmitting power thereto, a shaft geared to said main shaft to rotate therewith, said shaft being threaded in different portions along its length, a pair of gears, each located adjacent the end of a threaded portion on said shaft, brake applying mechanism connected to said gears to be actuated by the same, a second shaft connected to be rotated from one of the driving wheels and having gearing thereon to engage the gears on the first-named shaft, whereby, when the last-named shaft rotates faster or slower than the first-named shaft, one or the other of the gears on said first-mentioned shaft will be engaged by the threads on one of the threaded portions thereof and move longitudinally with respect to the said shaft when one of the driving wheels begins to race to check the same, and a clutch upon the shaft controlled by one of the driving wheels, said clutch being arranged to be actuated by a collar carried by the first-named shaft adjacent one of the threaded portions, whereby, when the vehicle reverses, the shaft receiving motion from one of the driving wheels will be thrown out of action.

4. In a motor vehicle, the combination of driving wheels and brake applying mechanism therefor, means controlled by the movement of one of said driving wheels to throw the brake applying mechanism into action when one of said driving wheels begins to race, and to check the same and thus prevent the power of the motor from being diverted from the other wheel, and means for throwing the first-named means out of controlled relation with respect to the said driving wheel in case said driving wheel moves in the opposite direction.

5. The combination of a driven member, means for checking the motion of said member, means for actuating said checking means, said checking means and said actuating means having portions adapted for mutual engagement and disengagement, and means for controlling the actuating means to cause said portions to engage when the driven member tends to race, and thus retard the motion of said member.

6. The combination of a driven member, means for checking the motion of said member, means for actuating said checking means, means for operating said actuating means independently of said member, and means for controlling the actuating means to cause the same to become effective with respect to the checking means when the driven member tends to race, and thus retard the motion of said member.

7. The combination of a driven member, means for checking the motion of said member, means for actuating said checking means, said checking means and said actuating means having portions adapted for mutual engagement and disengagement, means for controlling the actuating means to cause said portions to engage when the driven member tends to race, and thus retard the motion of said member, and means for rendering the controlling means inoperative in case the driven member starts in the wrong direction.

8. The combination of a driven member, means for checking the motion of said member, means for actuating said checking means, means for operating said actuating means independently of said member, means for controlling the actuating means to cause the same to become effective with respect to the checking means when the driven member tends to race, and thus retard the motion of the said member, and means for rendering the controlling means inoperative in case the driven member starts in the wrong direction.

9. The combination of a driven shaft and brake-applying mechanism therefor, means for driving said driven shaft, means operated by the driving means for actuating the brake-applying mechanism when the driven shaft begins to race, to check the same, means operated by the driven shaft to control the actuating means, and means for throwing the said controlling means out of operative relation with respect to the driven shaft in case the driven shaft turns in the opposite direction.

10. The combination of a driven member, means for checking the motion of the same, and means for rendering said checking means inoperative in case the driven member starts in the wrong direction.

11. The combination of a driven member, means for checking the motion of the same, means for actuating said checking means, means for controlling said actuating means, and means for preventing the operation of the controlling means in case the member starts in the wrong direction.

In testimony whereof I have signed my name to this specification in the presence of two subscribing witnesses.

JOEL ELLIS FISHER, Jr.

Witnesses:
TYLER CLARK,
ERASTUS H. HEWITT.